United States Patent [19]

Holzem et al.

[11] 4,305,302

[45] Dec. 15, 1981

[54] VOLUMETRIC MEASUREMENT OF A GAS FLOW

[75] Inventors: Heinz Holzem, Mönchengladbach; Helmut Kehrmann; Bernd Portmann, both of Kaarst, all of Fed. Rep. of Germany

[73] Assignee: Pierburg Luftfahrtgeräte Union GmbH, Neuss am Rhein, Fed. Rep. of Germany

[21] Appl. No.: 34,137

[22] Filed: Apr. 27, 1979

[30] Foreign Application Priority Data

May 2, 1978 [DE] Fed. Rep. of Germany ..... 28192388

[51] Int. Cl.³ .............................................. G01F 1/12
[52] U.S. Cl. ............................................... 73/861.83
[58] Field of Search .................... 73/198, 191, 861.79, 73/861.81, 861.82, 861.83

[56] References Cited

U.S. PATENT DOCUMENTS

| | | | |
|---|---|---|---|
| 3,633,420 | 1/1972 | Holzem | 73/199 |
| 3,686,948 | 8/1972 | Lahaye | 73/861.83 |
| 4,193,299 | 3/1980 | Holzem | 73/199 |

FOREIGN PATENT DOCUMENTS 2158100 6/1973 Fed. Rep. of Germany ... 73/861.81

Primary Examiner—Herbert Goldstein
Attorney, Agent, or Firm—Toren, McGeady & Stanger

[57] ABSTRACT

A volumetric direct gas meter is driven by a servomotor and the rotational speed of the motor is regulated in response to the pressure differential between the inlet and outlet ports of the meter so that the pressure tends to zero.

7 Claims, 5 Drawing Figures

VOLUMETRIC MEASUREMENT OF A GAS FLOW

This invention relates to a method of measuring a flow of gas, especially air, using a volumetric direct gas meter which is driven by a servomotor and the rotational speed of which is regulated in response to the pressure differential measured between the inlet and outlet ports of the gas meter so that the pressure differential tends to zero, and also to a device to carry out this method.

Gas meters which are not servo driven but are driven directly by the gas flow to be measured are known as passive meters, and are known in a large number of different forms. To drive these appliances, the required drive energy is taken from the gas flow to be measured, which results in a pressure drop causing a non-measured flow to leak through the unavoidable gap between the rotor and the casing of the meter. As the gas flow through the meter decreases, this leakage flow increases relative to the measured flow, so that the utilisable measuring range for predetermined error limits is very much restricted.

In order to avoid this disadvantage, various proposals have already been made in which the rotor speed of the meter is intended to be controlled by means of a servo drive in such a manner that the measured pressure differential, and thus also the leakage rate, between the inlet and outlet ports of the meter tends to zero. Servo driven gas meters of this type are referred to herein as active meters. There are, however problems in the measurement and control of the pressure differential, as will be explained in the following discussion.

According to the Hagen-Poiseuille Law, for the laminar slit flow which occurs with leakage in such gas meters, equation (1) gives the following leakage rate per unit time:

$$\dot{Q}_L = K_1 \cdot \Delta p \cdot A / \eta \quad (1)$$

where
$\dot{Q}_L$ = leakage rate per unit time
$K_1$ = coefficient
$\Delta p$ = pressure differential
$A$ = effective gap cross-section
$\eta$ = dynamic viscosity of the gas.

The relative measuring error F is, according to equation (2), defined as the ratio of leakage rate $\dot{Q}_L$ to the measured flow rate $\dot{Q}_m$:

$$F = \dot{Q}_L / \dot{Q}_m \quad (2)$$

Equation (1) substituted into equation (2) gives:

$$F = (K_1 \cdot A \cdot \Delta p / \eta \cdot \dot{Q}_m) \quad (3)$$

By introducting a leakage gradient:

$$K_2 = (K_1 \cdot A / \eta) \quad (4)$$

into equation (3), we obtain:

$$F = K_2 \cdot \Delta p \cdot (1/\dot{Q}_m) \quad (5)$$

Since the leakage gradient $K_2$ is dependent upon the unavoidable manufacturing tolerances of the meter (the effective gap cross-section A), which can only be reduced at great expense, and upon the particular gas ($\eta$), F can only be influenced by $\Delta p$. Let us consider the following numerical example:

With a conventional passive gas meter for a measuring range of 10 to 100 m³/h, a leakage gradient was obtained of:

$$K_2 = 0.001 (m^3/h \cdot \mu \text{ bar})$$

If it is desired to extend the measuring range down to $\dot{Q}_m = 1 m^3/h$, and to reduce the error to $F \geq \pm 0.25\%$, then according to equation (5) the permissible pressure differential for the maximum permissible error is:

$$\Delta p = F/K_2 \cdot \dot{Q}_m = \pm (0.0025/0.001) \cdot 1 \mu \text{ bar}$$

i.e. $\Delta p = \pm 2.5 \mu$ bar A remarkable improvement in the accuracy and an increase in the measuring range therefore requires regulation of the pressure differential $\Delta p$ down to an extremely small residual value of $\Delta p_{rest}$ of only a few microbar. Here it is a prerequisite that the flow rate $\dot{Q}_m \pm \dot{Q}_L$ fluctuates so little that the $\Delta p$—regulating system, including the servo drive with its limited speed of response, can still follow within $\Delta p_{rest}$. In practice, however, this cannot be achieved, since the pressure fluctuations which are predominantly determined in the pipeline considerably exceed the permissible $\Delta p$. In order to ensure that the average time value with time of the error shall vanish, it is necessary for the integral of equation (5) to be brought to zero:

$$\int F \cdot dt = K_2 \cdot (1/\dot{Q}_m) \int \Delta p \cdot dt \to 0 \quad (6)$$

To enable this integral to be brought to zero, correspondingly high requirements must be imposed on the measurement and regulation of $\Delta p$ in respect of:
 (a) Resolution;
 (b) Zero-point stability;
 (c) Deviation from linearity; (These values must lie within a few microbar, since any deviation beyond this leads, according to equation (6), to a distorted $\int F \cdot dt$ (error integral), and thus the desired mean value $\Delta p = 0$ is not correctly regulated).
 (d) Measuring range for $\Delta p$; (The measuring range must of course cover the fluctuations in $\Delta p$ which occur in normal operation.) and
 (e) Overload capability
 (If pronounced surges in $\Delta p$ occur, the $\Delta p$-sensor must not be mechanically overloaded.)

Pressure differential measuring devices are known, which almost comply with these requirements, with the exception of (b), but their technical complexity is exceedingly high. They are also expensive, and on account of their unfavourable cost relationship to the active meters with which they are to be used, these devices cannot be considered for practical applications.

Proposals are also known for solutions which concern the general principle of the active meters, but which do not lead to a really useful device. For example, reference may be made to DE-OS No. 1,773,651, which describes an active meter with an inductively sensed membrane as a proportional pressure differential sensor. With this device it has been shown that requirements (a) to (e) for gases cannot largely be fulfilled, and, in particular, frequent manual recalibration of the pressure differential sensor is necessary.

A pressure differential measuring device especially for liquid media is described in the German DE-PS No. 1,798,080. Measures are explained which so modify and amplify the principle hitherto known that, for a comparatively low cost, requirements (a) to (e) are indirectly satisfied in the case of liquid media and, moreover, the above equation (6) is directly realised. This is achieved by means of a freely movable piston which is disposed in a bypass line and which on account of the adapting of its specific gravity to that of the liquid is freed from shear forces, that is also from bonding friction. The piston reacts to extremely small deviations from a pressure differential of zero with a displacement which is equal to the integral of the pressure differential with respect to time. Thus, right from the start the offset and balancing problems otherwise resulting from the zero drift of a proportional $\Delta p$-sensor are eliminated. The piston also serves as a volume reservoir and can thus remove $\Delta p$ fluctuations from the meter. However, this device, which is especially suitable for high-accuracy liquid measurements suffers from certain disadvantages in the case of gas metering, including in particular the positional dependence of the piston resulting from the low gas density.

The basic aims of the present invention are to create a method of measuring a gas flow of the kind described, and also a device to carry out this method, which, while avoiding the above explained disadvantages of the known methods and devices, provides an improved quality of metering at reasonable expense, and which in particular leads to an economically acceptable design for gas metering. In this respect, an improvement in accuracy (hitherto known meters possess, for a measuring range of 1:10, an accuracy of about $\pm 1\%$) will permit larger manufacturing tolerances, for example in connection with the calibration of carburettors or the tuning of engines.

According to one aspect of the invention, in a method of measuring a flow of gas, especially air, using a volumetric direct gas meter which is driven by a servomotor and the rotational speed of which is regulated in response to the pressure differential measured between the inlet and outlet ports of the gas meter so that the pressure differential tends to zero, the pressure differential across the meter is measured by both a sensitive pressure differential sensor and by a insensitive pressure differential sensor, each of which is arranged to provide an electrical output signal in response to the pressure differential measured by the sensor, the electrical output signal from the sensitive pressure differential sensor is integrated through a slow-acting integrator and is added to the electrical output signal from the insensitive pressure differential sensor, and the sum of the two signals is integrated by a more rapidly acting integrator to provide a set point signal which is used in controlling the speed of the servomotor driving the meter, the two pressure differential sensors preferably having differing, mutually complementary measuring ranges.

With the coarse sensor (i.e. the insensitive pressure differential sensor), the dynamic control response of the $\Delta p$ regulation is improved, while the precision sensor (i.e. the sensitive pressure differential sensor) ensures the steady state accuracy. The integrating speed of the slow-acting integrator must therefore be sufficiently low, because the product of integrating speed and sensitivity of the precision sensor must not exceed a maximum value dependent upon the time constant of the entire control system, in order that the control system shall remain stable. The coarse sensor thereby still picks up without overtravelling the fairly large pressure differentials, whereas the far more sensitive precision sensor can more effectively resolve the smaller pressure differentials.

The method in accordance with the present invention makes possible for the first time, with an extremely simple construction (described later) of each of the two sensors, which each needs to possess only a resolution of $10^{-2}$, the creation of an overall resolution of nearly $10^{-4}$, which is scarcely achieved even with far more expensive sensors, at least not with small pressure differentials.

The precision or fine sensor is preferably balanced to zero at predetermined intervals, preferably periodically, by an automatically acting corrector circuit. In this case the invention involves an additional intermeshing of two already intermeshed control circuits, and instead of compensating for a measuring error, for example by leak rate balancing, the occurrence of the leakage rate and thus of the measuring error is prevented. In a preferred example, the precision sensor is pneumatically connected to the inlet and outlet ports of the active meter by solenoid valves, and by periodically briefly closing these valves, the pneumatic zero point can be obtained if simultaneously the pressure balancing can take place via a connection between the two ports of the sensor. For this purpose a permanently throttled connection is proposed, which causes a periodically decaying oscillation of the emitter to its mechanical zero point within an optimally short period.

The electrical output signal from the precision sensor measured at pneumatic zero, which differs from the ideal zero signal on account of the unavoidable drift, is preferably stored by digital means and in the subsequent measuring phase prior to the next balancing is subtracted from the precision sensor signal. As a result it is no longer necessary for the precision pressure differential sensor, including its measuring electronics, to be kept drift-free by complicated measures. During the correction, the slow integrator, as a consequence of zero equating of the input previously affected by the precision sensor signal, maintains its output signal at the value existing just before the correction. In this way disturbance of the dynamic control response is prevented in an advantageous manner.

In accordance with a further aspect of the invention, the gas meter may be operated using only one pressure differential sensor, the zero drift of which is balanced as described above. In this simplified method, it is necessary to provide only the coarse sensor, which is then moved functionally to the position of the fine sensor. According to this aspect of the invention therefore, in a method of measuring a flow of gas using a volumetric direct gas meter which is driven by a servomotor and the rotational speed of which is regulated in response to the pressure differential measured between the inlet and outlet ports of the gas meter so that the pressure differential tends to zero, the pressure differential across the meter is measured by a pressure differential sensor which is arranged to provide an electrical output signal in response to the pressure differential measured by the sensor, and the zero drift of the pressure differential sensor is balanced at defined intervals of time, preferably periodically, by an automatically acting corrector circuit which is arranged to close the gas lines connecting the pressure differential sensor across the meter so that the pressure across the sensor can be balanced, an electrical signal corresponding to the output signal of the sensor at this balance condition being retained in a memory and used as the zero point reference for the duration of the next measuring period.

This method, in which only one sensor is provided, can be used particularly where it is not an increase in the accuracy above the usual value that is predominantly required, but only a widening of the measuring range. In this case, of the earlier listed requirements (a) to (e), it is essentially the drift stabilisation that is important, since the smallest flow rate still to be measured must still be larger by a factor of several times than the flow rate $\dot{Q}_m$, which is still erroneously indicated when measuring the flow rate $\dot{Q}$. In such applications, a brief temporary disturbance of the dynamic control response during zero balancing can also be accepted. As mentioned, in this embodiment of the invention, only the coarse sensor is used, the sensor being connected so that it can be pneumatically isolated by solenoid valves and the automatic zero point correction device can act directly additively upon the signal of the coarse sensor instead of via the slow integrator.

As mentioned earlier, the present invention is also concerned with the nature of the devices for measuring the pressure differentials, i.e. the pressure differential sensor, and in particular the precision sensor. For the measurement of small pressure differentials, circular plate springs with concentric grooves, or soft membranes with support springs are commonly used. This leads to large deflections which, when detected by electrical means, provide a correspondingly large resolution. The grooves serve to reduce the stiffness of the plate springs and linearise the characteristics. At still smaller pressure differentials, as commonly occur in connection with the present invention, very thin membranes of large diameter would have to be used in order to attain sufficiently large deflections which can be measured electrically by simple and economic means. Such membranes are, however, difficult to manufacture and require special precautions in handling.

In German DE-OS No. 1,801,685, a pressure measuring device is proposed having a blade which is rotatably mounted about an axis and which is moved with a small gap between fixed partitions under the action of the pressure differential, a restoring force being produced by a spiral spring acting upon the axis.

Furthermore, a micromanometer is illustrated and described in "Technische Strömungslehre", Eck, 7th Edition 1966, in which a lever is pivotally journalled at one end and carries at the other end an annular piston, which is curved to correspond to its circular movement facility, and which penetrates with slight clearance but without contact into a bore. The pressure-sensitive surface is provided by the cross-section of the piston, and the restoring force is generated by a separate torsion bar spring, which also serves as the axle for mounting the lever.

The latter two devices can respond to pressure differentials of less than one microbar if a sufficiently easily running mounting and a very soft restoring spring are used. Accurate electrical displacement sensing is indeed also possible in these devices, but for practical use they suffer from the unacceptable disadvantage of their sensitivity to pressure surges and the resultant mass forces, which lead to overloading of the bearing and/or to undesired deformation of the pressure-sensitive components, resulting in jamming. Furthermore, because of the construction, the ratio of mass inertia forces to spring forces is comparatively large, leading to an intrinsic frequency which is unsatisfactorily low for control purposes. Moreover, this frequency dies away only slowly on account of the weak damping resulting from the product of the mass inertia forces and the leakage gap area of the meter, so that there is a risk of resonance build-up from external vibrations.

With the aim of avoiding these disadvantages, according to a further aspect of the present invention, a pressure differential sensor for use in carrying out the method comprises a leaf-spring clamped at one end in a chamber so that the spring moves with a uniform clearance between the spring and the walls of the chamber adjacent the side and free end edges of the spring, and abutments which face the opposite faces of the leaf spring to limit the maximum deeflection of the spring and which are shaped to match the bending curve of the leaf spring, the abutments being connected in a sealed manner to the walls of the chamber and possessing through bores which communicate the chamber with the inlet and outlet of the sensor and which are completely covered when the leaf-spring bears against them.

The leaf-spring should possess a sufficient width in relation to its length so that a very slight tilting movement in the plane of the leaf is possible if necessary. As a result of the fact that the clamping position is free of clearance, the leaf-spring can be fitted with a small clearance of only a few hundredths of a millimeter without contact between the walls of the chamber.

Preferably, the deflection of the free end of the leaf-spring is measured with an electrical displacement transducer which possesses an active end surface terminating flush with one of the abutments.

In many applications it may be favourable, for the purpose of improving the dynamic characteristics of the control range in gas lines of large volume (consisting of the meter and the piping system) to provide a partial pneumatic decoupling of the pressure differential tapping point and the meter from the volume of the gas line. For this purpose, a flow resistor may be provided in the gas flow line upstream or downstream of the gas meter and the branch lines to the pressure differential sensor or sensors, in which the exponent of the dependence of the pressure drop upon the gas flow rate to be measured is less than two. This resistor therefore possesses an automatically varying cross-section, so that a pressure drop exists at even small flow rates, and at large flow rates the pressure drop does not become undesirably high.

Examples of the methods and apparatus in accordance with the invention will now be described with reference to the accompanying drawings, in which.

Figure 1:
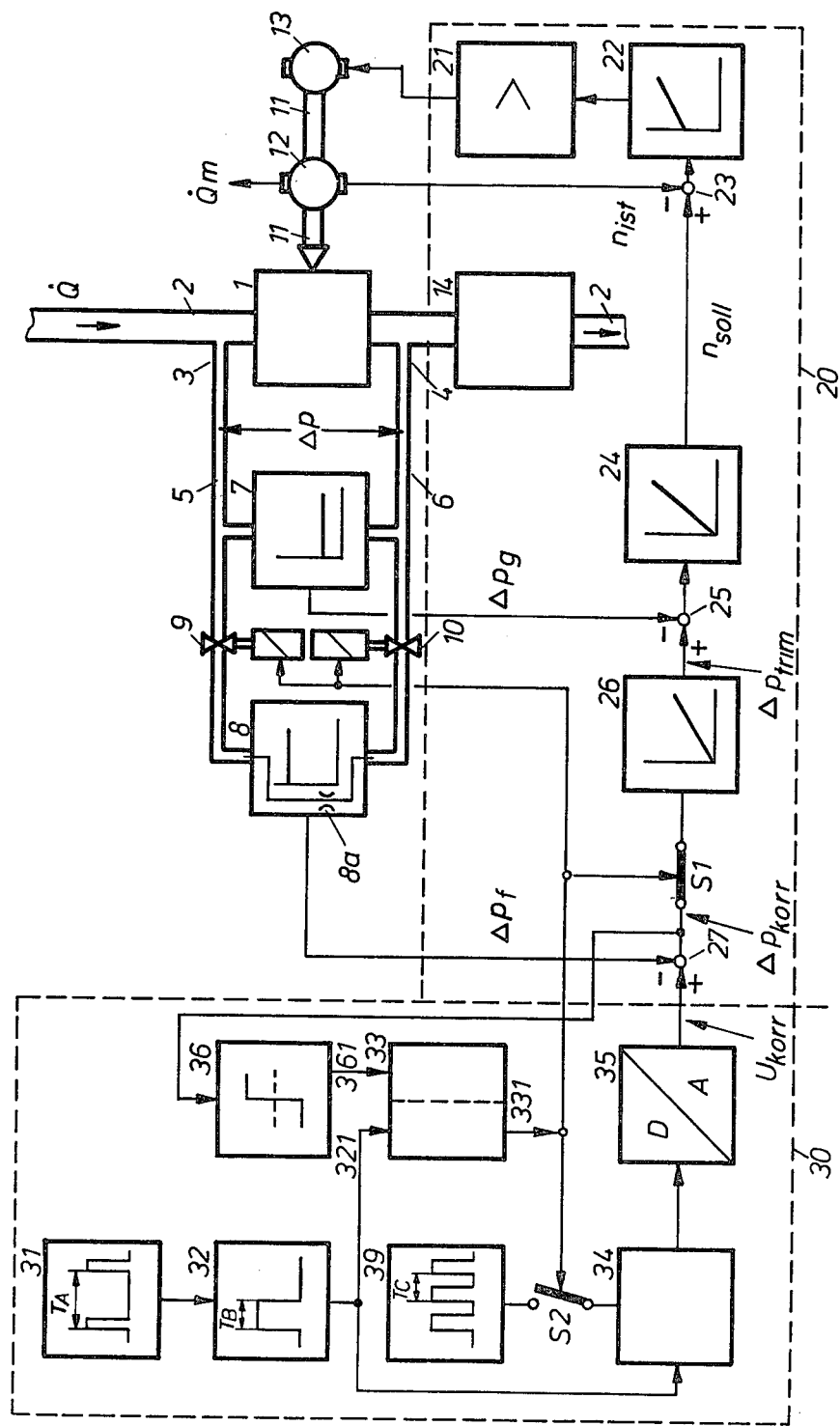
FIG. 1 is a schematic circuit diagram of one example of the method in accordance with the invention using two pressure differential sensors.

In the arrangement shown in FIG. 1, an active gas meter 1 operating on the displacement principle is incorporated in a gas line 2, the flow being in the direction of the arrow. At the inlet port of the gas meter there is a tapping point 3 for the inlet pressure, which leads via a line 5 to a coarse pressure differential sensor 7 and via a solenoid valve 9 to a fine or precision pressure differential sensor 8.

At the outlet side of the meter 1 a tapping point 4 conducts the outlet pressure via a line 6 to the coarse sensor 7 and via a solenoid valve 10 to the precision sensor 8. A throttled connection through the precision emitter is referenced 8a. The rotor of the meter 1 is mechanically coupled via a shaft 11 to a servo-motor 13 and a speed emitter 12. From the difference $\Delta p$ between the inlet and outlet port pressures at the meter 1, a signal $\Delta p_g$ is produced by the coarse sensor 7 and a signal $\Delta p_f$ by the precision sensor 8, and these two signals are supplied to a circuit 20 in which three control circuits are intermeshed with one another.

In a first of these control circuits the difference between a set point speed $n_{soll}$ and the actual speed $n_{ist}$ of the speed emitter 12 is formed at a summation point 23 and is supplied to a P-I-controller 22, the output signal of which is amplified in power amplifier 21 and drives the servomotor 13.

The signal $\dot{Q}_m$, corresponding to the gas throughput Q at $\Delta p = 0$ and proportional to the actual speed $n_{ist}$, can be indicated and evaluated. Onto this first control circuit for the speed, a second control circuit for the $\Delta p_g$ signal is superimposed, in which the difference between a set point pressure differential $\Delta p_{trim}$ and the actual pressure differential $\Delta p_g$ from the coarse sensor 7 is formed at a summation point 25, and from this the set point rotational speed $n_{soll}$ is produced by a rapid-acting integrator 24.

Within the framework of the already mentioned division of tasks between the two pressure differential sensors 7 and 8, the signal $\Delta p_{trim}$ is generated by a third control circuit, known as a trim control circuit. The precision sensor 8 converts even extremely small pressure differential $\Delta p$ into proportional signals $\Delta p_f$ which, acting through a summation point 27, a switch S1 and a slow-acting integrator 26, trim the signal $\Delta p_g$ at the summation point 25. As a result, if the pressure differential $\Delta p$ becomes so small that the coarse emitter 7 would emit only noise-composed signals in the millivolt range and the integrator 24 would integrate these and its own input offset voltage, this is prevented by $\Delta p_{trim}$. On the other hand, if the gas flow rate $\dot{Q}$ rises rapidly, $\Delta p_{trim}$ cannot follow, and in this case virtually the coarse control circuit alone is in engagement with the speed control circuit in order to raise the speed rapidly. After the coarse regulation, that is as soon as $\Delta p$ differs from $\Delta p = 0$ only by the amount of the measuring range of the precision sensor 8, $\Delta p_{trim}$ again becomes dominant.

Figure 2:
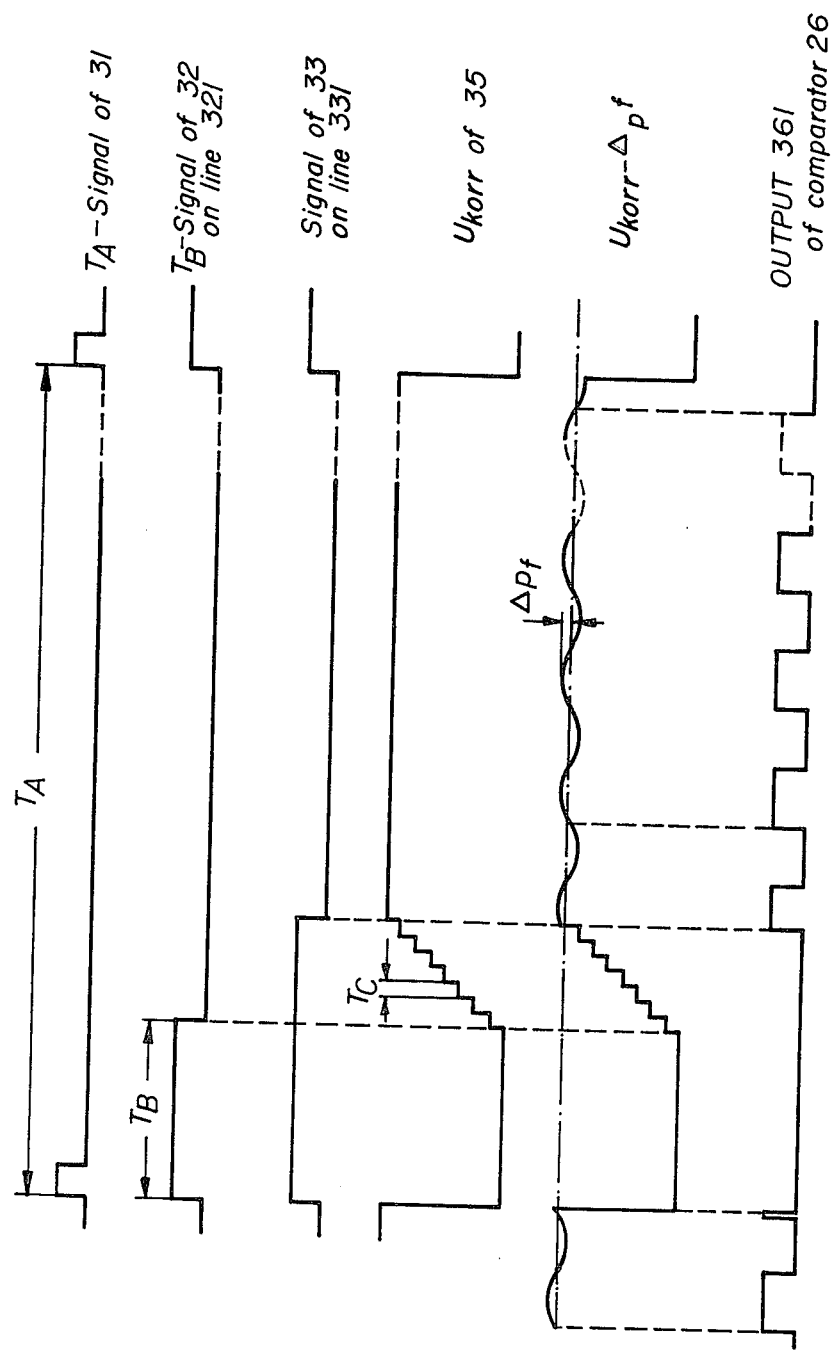
FIG. 2 is a pulse diagram illustrating the operation of the automatic zero balancing circuit included in FIG. 1.

FIG. 1 shows furthermore a preferred form of an automatic zero balancing circuit 30, for which the timing chart of FIG. 2 applies. The circuit 30 comprises a pulse generator 31 with a period $T_A (\sim 5$ min$)$ arranged to initiate a monoflop 32 with the pulse duration $T_B (\sim 1$ s$)$. With a signal 321 the monoflop 32 resets a flipflop 33 and simultaneously a digital counter 34, in which a balancing value $U_{korr}$ is binary stored. An output signal 331 from the flipflop 33 has the following effect:

(a) The precision sensor 8 is isolated from the lines 5 and 6 by the closure of the two solenoid valves 9 and 10, so that through the in-built throttle 8a of the sensor a pressure balance takes place. After a settling time $T_B$ the pressure differential across the sensor comes mechanically to zero.

(b) The switch S1 is opened. The integrator 26 thus stops and stores for the duration of the balancing period the set point $\Delta p_{trim}$ for the subordinate $\Delta p_g$-control circuit, which in the meantime continues to operate undisturbed.

(c) A switch S2 in the circuit 30 is closed. As a result, pulses of duration $T_C (\sim 1$ ms$)$ are conducted from a timing pulse generator 39 to the digital counter 34, so that after the settling period $T_B$ has expired, that is after the reset signal 321 has disappeared, the counter counts the pulses from the timing pulse generator 39 from zero upwards.

A digital-analogue converter 35 converts the increasing counter content into an analogue signal $U_{korr}$. The signal $\Delta p_f$ from the balanced sensor 8 is subtracted from $U_{korr}$ at the summation point 27. The difference $\Delta p_{korr}$ passes to a comparator 36. Since the digital counter was reset to zero at the commencement of the balancing period, the comparator initially switches positively to logic zero. As soon as the counter 34 has run sufficiently high for $\Delta p_{korr}$ to be equal to or less than zero, the output signal 361 from the comparator 36 switches to logic one and resets the flipflop 33, causing S2 to open, the counter 34 to stop and therefore the correction value $U_{korr}$ to be stored until the next balancing operation. The zero balance therefore relates to the precision sensor 8 and not to the integrator 26, which can likewise drift as a result of offset. By choosing, for example, a chopper-stabilised amplifier for constructing the integrator 26, the maximum offset voltage at its input can, however, be kept well below the smallest useful signal from the precision sensor.

Figure 3:
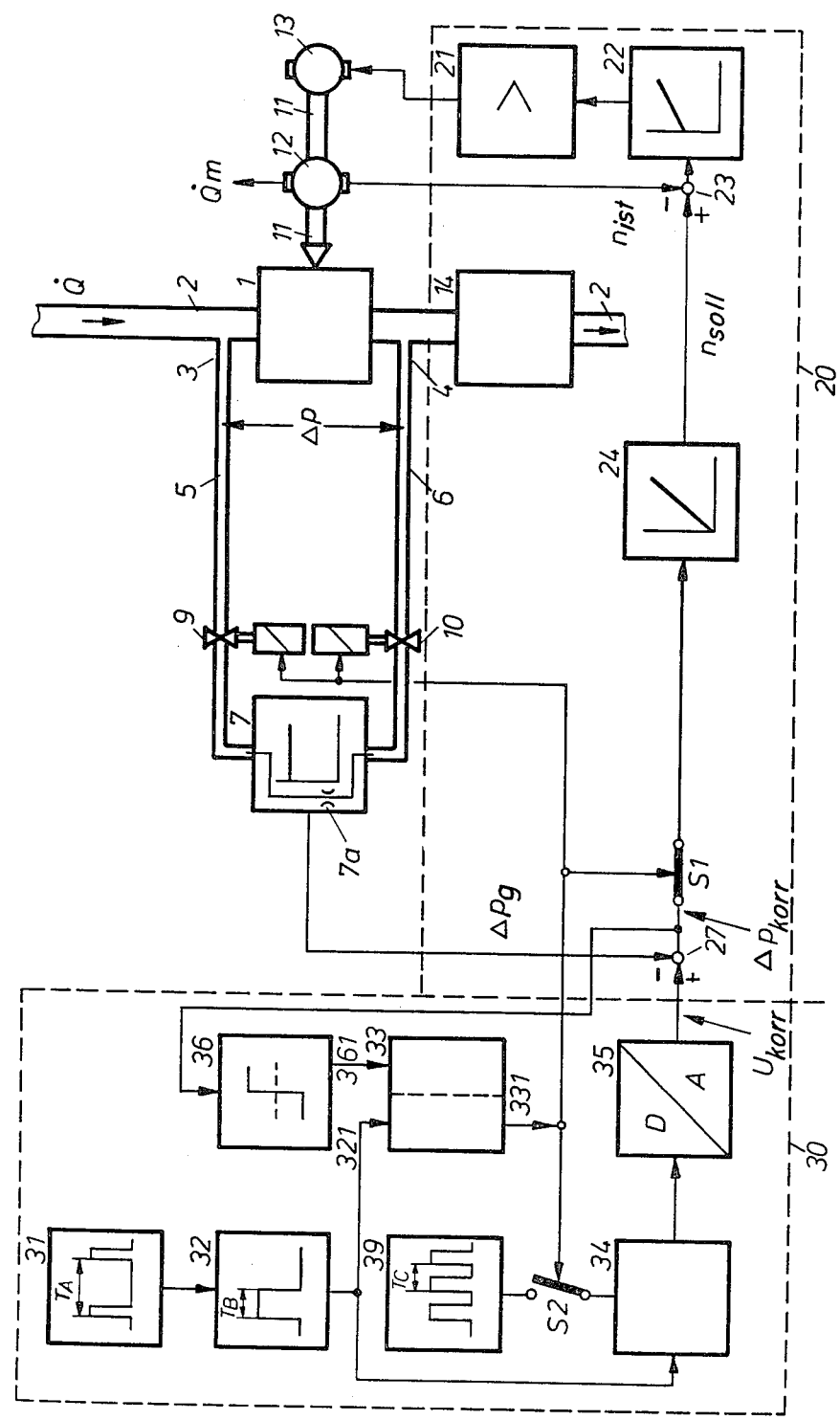
FIG. 3 is a schematic circuit diagram of an example of the method in accordance with the invention using only a coarse pressure differential sensor.

FIG. 3 represents an embodiment of the invention simpler than that of FIG. 1. As already mentioned, it is sufficient in certain applications to do without the precision sensor 8, the coarse emitter 7 taking its place. The signal $U_{korr}$ is then conducted via the switch S1, leaving out the slow-acting integrator 26 and the summation point 25, directly to the integrator 24. In this case the coarse sensor 7 is provided with a balancing throttle connection 7a so that zero balancing of the sensor 7 can be effected by the circuit 30.

Figure 4:
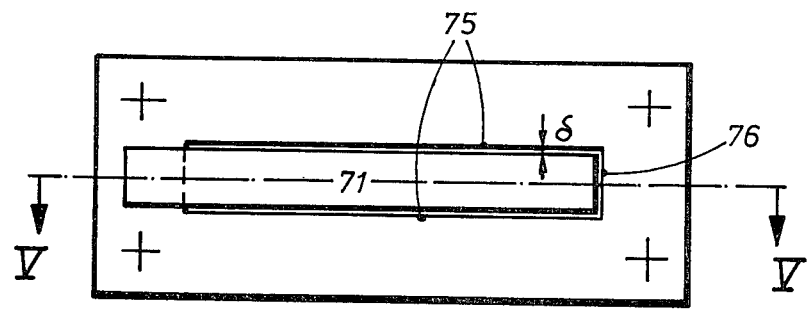
FIG. 4 is a plan of a preferred embodiment of a pressure differential sensor in accordance with the invention, the view being taken on the line IV—IV in FIG. 5; and, FIG. 5 is a cross-section through the sensor taken on the line V—V shown in FIG. 4.
Figure 5:
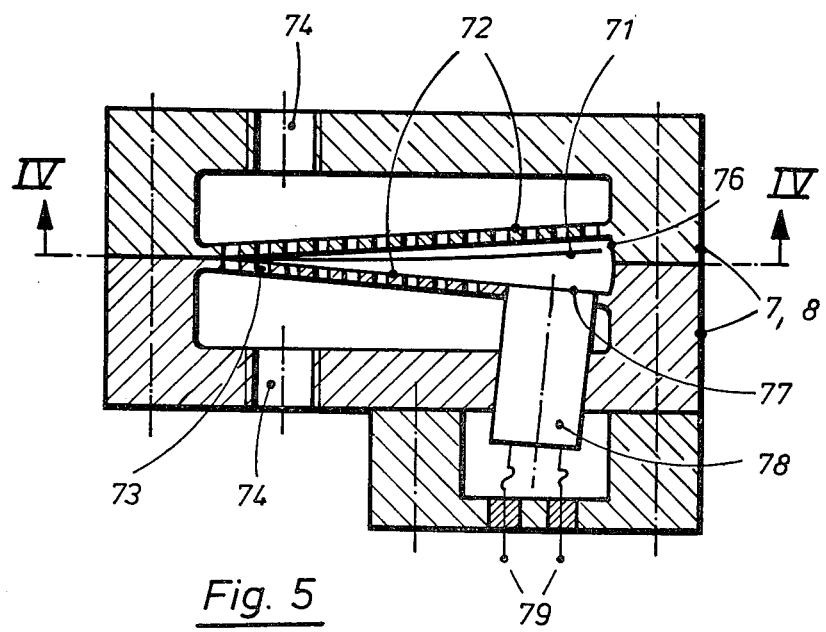

FIGS. 4 and 5 show a preferred construction for both the pressure differential sensors 7, 8. A leaf-spring 71, which is not bent in the unloaded state, that is where $\Delta p = 0$, is firmly clamped between two diverging abutments 72 as shown at the left-hand side of the Figures. The abutments 72 are furnished with a number of bores 73 so that the gas flow entering and leaving the sensor 7 through connections 74 as a result of a pressure differential $\Delta p$ across the meter builds up the pressure differential $\Delta p$ practically without pressure loss at the leaf-spring 71. During a pressure surge which exceeds the measuring range of the sensor 7, the leaf-spring 71 lies against one of the abutments 72, whereby mechanical overloading of the leaf-spring is prevented.

Flat side walls 75 extend parallel to each other, at least in the region between the two abutments 72, and constitute, together with a concave curved end wall 76 and the abutments 72, a chamber in which the leaf-spring 71 can execute its movements with a uniform small clearance of about 0.05 mm between it and the walls 75 and 76. As a result of the small clearance, within the pressure differential measuring range the leakage rate through the gap is kept negligibly small in comparison with the leakage rate still present at the active meter. If the $\Delta p$ measuring range is exceeded even for only a short period, the bores 73 are completely covered by the leaf-spring 71, so that the leakage rate does not increase further.

The deflection, which with suitable dimensioning of the leaf-spring 71 is sufficiently large even at extremely small pressure differentials, can still be measured with sufficient accuracy at quite low cost by means of a simple commercially available displacement measuring system. It has proved advantageous to use a so-called analogue proximity initiator 78, the active surface 77 of which lies flush with the contour of one of the abutments 72.

An important factor for control stability is the adapting of the amplifications of the three control circuits for the $\Delta p_g$, $\Delta p_f$ and the rotational speed n signals to the properties of the gas measuring range, such as volume and compressibility of the gas. The pipe volume upstream and that downstream of the meter may be regarded as a system with two springs connected in parallel, the smaller of the two pipe volumes representing the harder of the springs. The meter, including its drive, can then be thought of as a mass suspended at the springs. If this system, which is frequently capable of oscillations, possesses very low natural frequencies, then by using a flow resistor 14 (as previously mentioned) in series with the meter 1, the measuring device can be effectively decoupled from the remainder of the piping system. As a result the natural frequency of the measuring apparatus is increased, thus facilitating a stable setting of the control circuits.

We claim:

1. In a method of measuring a flow of gas, especially air, using a volumetric direct gas meter wherein said meter is driven by a servomotor and the rotational speed of which is regulated in response to the pressure differential measured between the inlet and outlet ports of said gas meter so that said pressure differential tends to zero, the steps of providing relatively sensitive and relatively insensitive pressure differential sensors each of which is capable of providing an electrical output signal in response to the pressure differential measured by the sensor, connecting both said sensitive pressure differential sensor and said insensitive pressure differential sensor to measure the pressure differential across said gas meter, providing a slow acting integrator and a more rapidly acting integrator, integrating the electrical output signal from said sensitive pressure differential sensor through said slow acting integrator, adding said integrated output signal from said sensitive pressure differential sensor to the electrical output signal from said insensitive pressure differential sensor to provide a sum signal, integrating said sum signal through said more rapidly acting integrator to provide a set point signal, and using said set point signal to control the speed of said servomotor driving said gas meter.

2. A method as claimed in claim 1, wherein said sensitive and said insensitive pressure differential sensors have differing mutually complementary measuring ranges.

3. A method as claimed in claim 1, including the steps of providing an automatically acting corrector circuit capable of balancing said sensitive pressure differential sensor to zero, and operating said corrector circuit to balance said sensitive pressure differential sensor to zero at defined intervals, preferably periodically.

4. A method as claimed in claim 1, including the steps of shutting off the connection of said pressure differential sensor across said meter at defined intervals of time, preferable periodically, balancing the pressure across said sensor during said shut-off periods, deriving an electrical signal corresponding to the output signal from said sensor at said pressure balanced condition, and using said derived signal as a zero point reference for the duration of the next measuring period of the pressure differential across said gas meter, whereby said pressure differential sensor is balanced for zero drift.

5. A method as claimed in claim 4, wherein said step of balancing said internal pressure across said sensor is effected by means of a throttled connection parallel to said sensor.

6. A method according to claim 4, including the step of providing a flow resistor in the gas flow pipeline upstream or downstream of said gas meter and said connections to said pressure differential sensor, wherein the exponent of the dependence of the pressure drop upon the gas flow rate to be measured is less than 2.

7. A method as claimed in claim 1, including the step of providing a flow resistor in the gas flow pipeline upstream or downstream of said gas meter and said connections to said pressure differential sensors, wherein the exponent of the dependence of the pressure drop upon the gas flow rate to be measured is less than 2.

* * * * *